US010051215B2

(12) United States Patent
Yun et al.

(10) Patent No.: US 10,051,215 B2
(45) Date of Patent: Aug. 14, 2018

(54) PIXEL BIASING DEVICE FOR CANCELING GROUND NOISE OF RAMP SIGNAL AND IMAGE SENSOR INCLUDING THE SAME (71) Applicant: SK hynix Inc., Gyeonggi-do (KR)

(72) Inventors: Gun-Hee Yun, Gyeonggi-do (KR); Hyun-Mook Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 94 days.

(21) Appl. No.: 15/251,962

(22) Filed: Aug. 30, 2016

(65) Prior Publication Data
US 2017/0214868 A1 Jul. 27, 2017

(30) Foreign Application Priority Data

Jan. 26, 2016 (KR) .................... 10-2016-0009328

(51) Int. Cl.
H04N 5/357 (2011.01)
H04N 5/3745 (2011.01)
H04N 5/378 (2011.01)

(52) U.S. Cl.
CPC ........... H04N 5/3575 (2013.01); H04N 5/378 (2013.01); H04N 5/37455 (2013.01)

(58) Field of Classification Search
CPC ... H04N 5/3575; H04N 5/37455; H04N 5/378
See application file for complete search history.

(56) References Cited

U.S. PATENT DOCUMENTS

| 8,654,230 | B2* | 2/2014 | Wakabayashi | H04N 5/335 348/241 |
| 2009/0033759 | A1* | 2/2009 | Wakabayashi | H04N 5/335 348/222.1 |
| 2009/0237536 | A1* | 9/2009 | Purcell | H04N 5/3355 348/294 |
| 2011/0249162 | A1* | 10/2011 | Moore | H04N 5/3658 348/308 |
| 2012/0006973 | A1* | 1/2012 | Storm | H04N 5/3575 250/208.1 |
| 2014/0055176 | A1* | 2/2014 | Zhang | H03K 4/00 327/137 |

FOREIGN PATENT DOCUMENTS

| JP | 2010251914 | 11/2010 |
| KR | 1020070060437 | 6/2007 |
| KR | 1020090117192 | 11/2009 |
| KR | 1020100118772 | 11/2010 |

* cited by examiner

Primary Examiner — Nicholas G Giles
(74) Attorney, Agent, or Firm — IP & T Group LLP (57) ABSTRACT A pixel biasing device includes a ramp ground noise unit, a bias current generation unit, and a pixel biasing unit; the ramp ground noise unit being suitable for generating a ramp ground noise and for transferring the ramp ground noise to the bias current generation unit; the bias current generation unit being suitable for generating a bias current by combining an inputted reference current with the ramp ground noise received from the ramp ground noise unit; and the pixel biasing unit being suitable for performing a biasing operation on an inputted pixel signal based on the bias current.

16 Claims, 8 Drawing Sheets

PIXEL BIASING DEVICE FOR CANCELING GROUND NOISE OF RAMP SIGNAL AND IMAGE SENSOR INCLUDING THE SAME

CROSS-REFERENCE TO RELATED APPLICATIONS

The present application claims priority of Korean Patent Application No. 10-2016-0009328, filed on Jan. 26, 2016, which is incorporated herein by reference in its entirety.

BACKGROUND

1. Field

Exemplary embodiments of the present invention relate generally to an image sensor and, more particularly, to a pixel biasing device for canceling a ground noise of a ramp signal from a ramp signal generation apparatus through a correlated double sampling (CDS) operation of a comparator.

2. Description of the Related Art

In general, an image sensor, such as a complementary metal oxide semiconductor (CMOS) image sensor, converts an analog signal (i.e., a pixel signal) generated from a pixel array into a digital signal (i.e., a pixel data) unlike a solid state pick-up device. An analog-to-digital converter (ADC) having a high resolution is used in the CMOS image sensor to convert the analog signal into the digital signal.

The CMOS image sensor may use a single ADC or a column ADC.

A CMOS image sensor with a single ADC uses a method for converting an analog signal outputted from a pixel array of all columns within a predetermined time using the single ADC, which operates at a high speed, and reduces a chip area of the CMOS image sensor. However, a CMOS image sensor with a single ADC consumes generally a larger amount of power because the ADC operates at a high speed.

A CMOS image sensor with a column ADC is implemented by disposing a single ADC at each column. Hence one disadvantage of a CMOS image sensor with a column ADC is that it generally requires a larger chip area. On the other hand, a CMOS image sensor with a column ADC consumes less power than a CMOS with a single ADC because each of the ADCs operate at a low speed.

A CMOS image sensor with a column ADC performs a CDS operation on an analog output voltage, that is, an output signal of a pixel array, stores a result voltage of the CDS operation, and provides a comparison signal for generating a digital code by comparing the stored result voltage of the CDS operation with a predetermined reference voltage (i.e., a ramp signal) in response to a ramp signal generated from a ramp signal generator.

As described above, since a conventional CMOS image sensor uses different voltages in a ramp signal generation apparatus and a pixel array, a pixel power noise and a pixel ground noise may occur in a pixel array. Also, a ramp power noise and a ramp ground noise may occur in a ramp signal generator. The pixel power noise, the pixel ground noise and the ramp power noise among the above-described noises may be canceled by various well-known techniques, but it is difficult to cancel the ramp ground noise, and a signal noise may occur due to the ramp ground noise.

SUMMARY

Various embodiments of the present invention are directed to a pixel biasing device, and a CMOS image sensor including the same. The pixel biasing device substantially reduces or cancels a ramp ground noise from a ramp signal generator. The pixel biasing device may employ a CDS operation of a comparison unit by adding a ramp ground noise to a pixel signal.

In an embodiment of the present invention, a pixel biasing device may include a ramp ground noise unit, a bias current generation unit, and a pixel biasing unit; the ramp ground noise unit being suitable for generating a ramp ground noise and for transferring the ramp ground noise to the bias current generation unit; the bias current generation unit being suitable for generating a bias current by combining an inputted reference current with the ramp ground noise received from the ramp ground noise unit; and the pixel biasing unit being suitable for performing a biasing operation on an inputted pixel signal based on the bias current.

In an embodiment of the present invention, an image sensor may include a pixel array suitable for outputting a pixel signal corresponding to incident light; a row decoder suitable for selecting a pixel of the pixel array at each row line; a ramp ground noise unit suitable for generating a ramp ground noise and for transferring the ramp ground noise; a bias current generation unit suitable for generating a bias current based on a reference current with the transferred ramp ground noise into the bias current; a pixel biasing unit suitable for performing a biasing operation on the pixel signal based on the bias current; a ramp signal generation unit suitable for generating a ramp signal; a comparison unit suitable for comparing the ramp signal with each pixel signal outputted from the pixel biasing unit; a counting unit suitable for counting a clock signal based on each output signal of the comparison unit; a memory unit suitable for storing counting information outputted from the counting unit; a column read-out circuit suitable for outputting the counting information stored in the memory unit as pixel data; and a control unit suitable for controlling the operations of the row decoder, the ramp signal generation unit, the counting unit, the memory unit and a column read-out circuit.

In an embodiment of the present invention, a pixel biasing method may include generating a ramp ground noise; transferring the ramp ground noise; generating a bias current based on a reference current with reflecting the transferred ramp ground noise into the bias current; and performing a biasing operation on a pixel signal based on the bias current in which the ramp ground noise is reflected.

DETAILED DESCRIPTION

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Throughout the specification, when an element is referred to as being "coupled" to another element, it may not only indicate that the elements are "directly coupled" to each other, but also indicate that the elements are "electrically coupled" to each other with another element interposed therebetween.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily drawn to scale and, in some instances, proportions may have been exaggerated in order to clearly illustrate features of the embodiments.

The terminology used herein is for the purpose of describing particular embodiments only and is not intended to be limiting of the present invention. As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth for providing a thorough understanding of the present invention. The present invention may be practiced without some or all of these specific details. In other instances, well-known process structures and/or processes have not been described in detail to avoid unnecessarily obscuring the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

Figure 1:
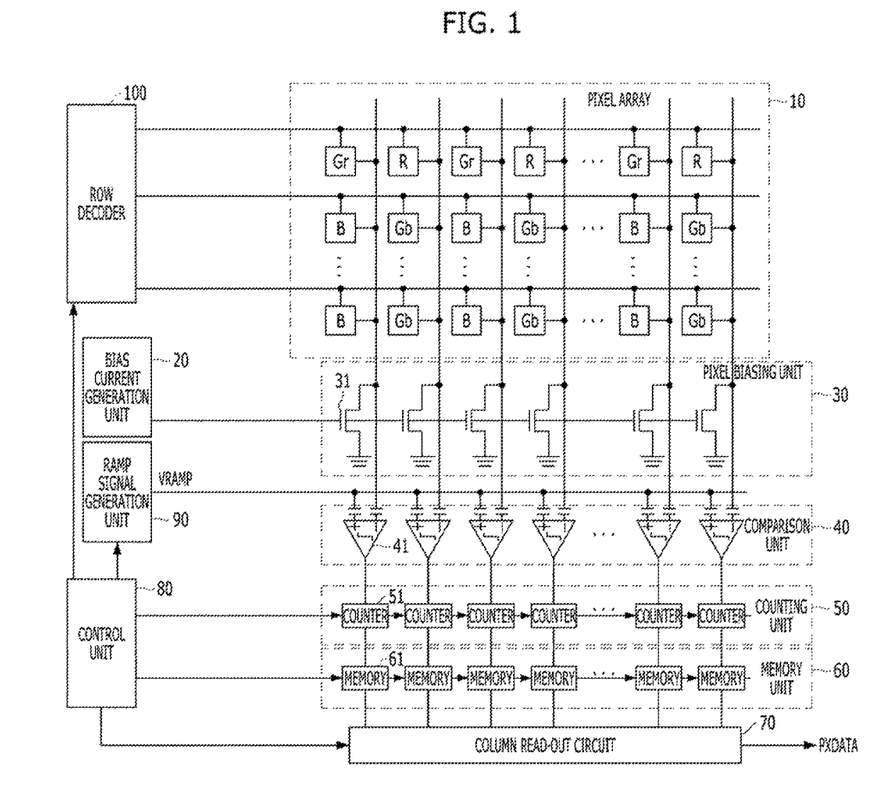
FIG. 1 is a block diagram illustrating a CMOS image sensor which is not using bias sampling.
Figure 2:
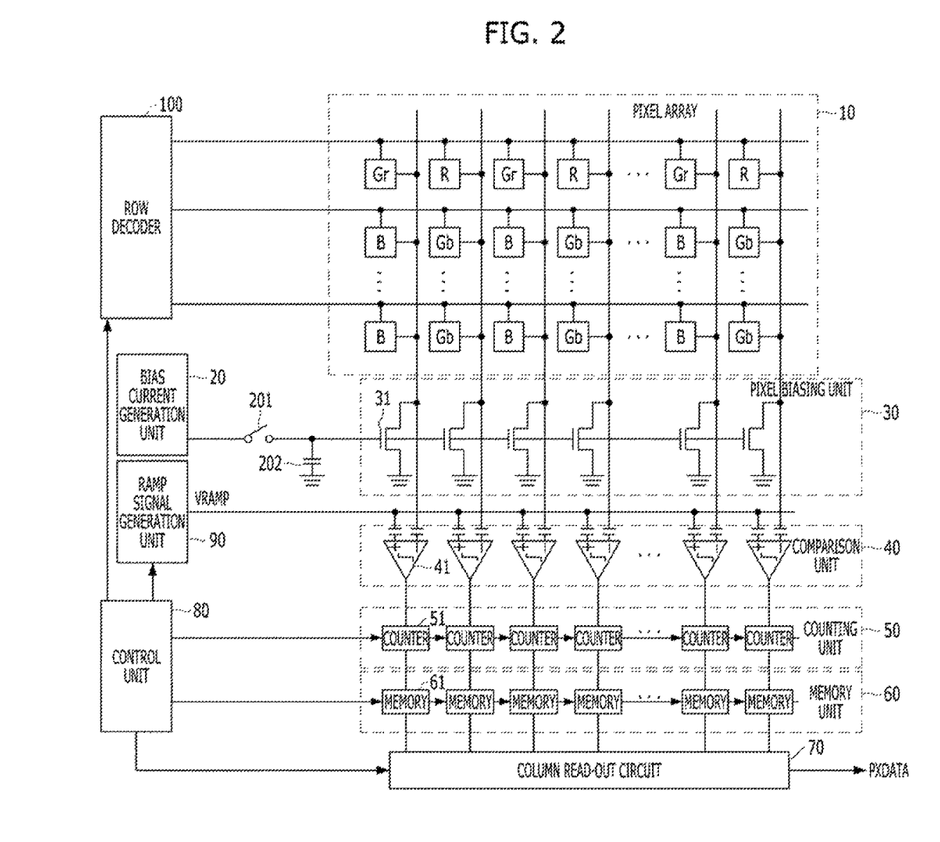
FIG. 2 is a block diagram illustrating a CMOS image sensor using bias sampling.
Figure 3:
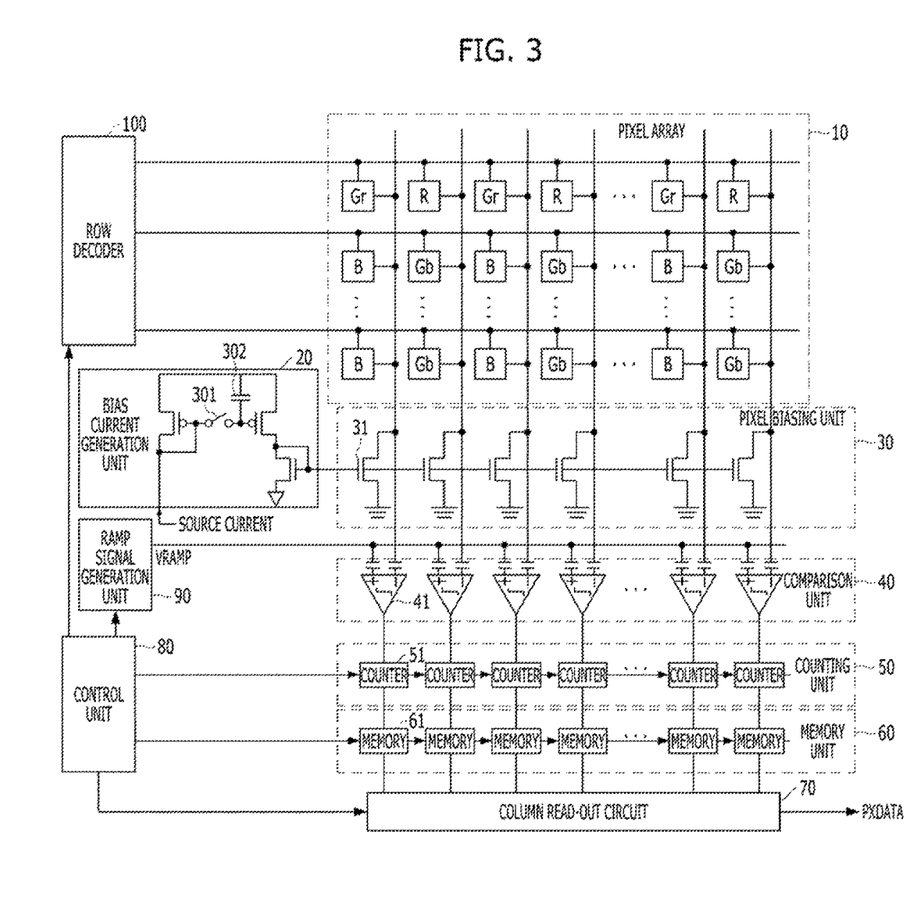
FIG. 3 is another block diagram illustrating a CMOS image sensor using a bias sampling.

FIG. 1 is a block diagram illustrating a CMOS image sensor which is not using bias sampling. FIG. 2 is a block diagram illustrating a CMOS image sensor using bias sampling. FIG. 3 is another block diagram illustrating a CMOS image sensor using bias sampling.

As shown in FIGS. 1 to 3, the CMOS image sensor includes a pixel array 10, a row decoder 100, a bias current generation unit 20, a pixel biasing unit 30, a ramp signal generation unit 90, a comparison unit 40, a counting unit 50, a memory unit 60, a control unit 80 and a column read-out circuit 70.

The pixel array 10 outputs a pixel signal corresponding to incident light. The row decoder 100 selects pixels of the pixel array 10 by each of row lines and controls an operation of the pixels under the control of the control unit 80. The control unit may include a timing generator. The bias current generation unit 20 generates a bias current according to a reference current. The pixel biasing unit 30 performs a biasing operation on the pixel signal outputted from the pixel array 100. The ramp signal generation unit 90 generates a ramp signal VRAMP under the control of the control unit 80. The comparison unit 40 compares a value of the ramp signal VRAMP applied from the ramp signal generation unit 90 with a value of each pixel signal outputted from the pixel biasing unit 30. The counting unit 50 counts a clock signal provided from the control unit 80 according to each output signal of the comparison unit 40. The memory unit 60 stores counting information outputted from the counting unit 50 under the control of the control unit 80. The control unit 80 controls the operations of the row decoder 100, the ramp signal generation unit 90, the counting unit 50, the memory unit 60 and the column read-out circuit 70. The column read-out circuit 70 sequentially outputs the counting information stored in the memory unit 60 as pixel data PXDATA under the control of the control unit 80.

Generally, for cancelling an offset value of the pixel in the CMOS image sensor, only a pixel signal of the incident light is measured by comparing a value of the pixel signal at a time before an optical signal is received with a value of the pixel signal at a time after an optical signal is received. Such a technique is referred as a correlated double sampling (CDS). This CDS operation is performed by the comparison unit 40.

The comparison unit 40 includes a plurality of comparators 41. The counting unit 50 includes a plurality of counters 51, and the memory unit 60 includes a plurality of memories 61. That is, one comparator, one counter and one memory are arranged at each column.

Next, operations (i.e., analog-to-digital conversion operations) of one comparator 41, one counter 51 and one memory 61 will be exemplarily described as below.

In operation, the comparator 41 has first and second input terminals. The comparator 41 receives a pixel signal, which is applied through a bias transistor 31 arranged at a first column of the pixel biasing unit 30, through the first terminal of the comparator 41. The comparator also receives the ramp signal RAMP, which is applied from the ramp signal generation unit 90, through the second terminal of the comparator 41. The comparator 41 compares the pixel signal with the ramp signal RAMP and outputs a comparison signal thorough its output terminal to a respective counter 51 in the same column.

Since a voltage level of the ramp signal RAMP ramps (i.e., falls or rises) as time elapses, the value of the pixel signal becomes the same as the value of the ramp signal RAMP at a certain point in time. After that certain point in time, a value of the comparison signal outputted from the comparator is inverted.

Thus, the counter 51 counts a clock signal provided from the control unit 80 from when the ramp signal starts to ramp to when the comparison signal outputted from the comparator 41 is inverted, and outputs the counting information to a respective memory 61 in the same column. The counter 51 is initialized in response to a reset signal outputted from the control unit 80.

The memory 61 stores the counting information outputted from the counter 51, and outputs the counting information to the column read-out circuit 70 under the control of the control unit 80.

Meanwhile, the bias current generation unit 20 receives a source current (reference current) from an external current supplying unit (not shown), amplifies or reduces the current amount of the source current to generate a bias current and provides the bias current to each bias transistor 31 of the pixel biasing unit 30.

The pixel biasing unit 30 amplifies a pixel signal of the pixel array 10 according to the bias current outputted from the bias current generation unit 20, and provides the amplified pixel signal to the comparison unit 40.

However, in the case the CMOS image sensor of FIG. 1 which is not using bias sampling, since a bias current, which is applied to the bias transistor 31 of the pixel biasing unit 30, is directly provided from the bias current generation unit 20, image quality may be deteriorated due to a noise, which is generated from the bias current generation unit 20 and applied to the bias transistor 31, or due to an external noise which is inputted from an external device.

To substantially reduce or prevent image quality deterioration, various techniques have been used. A first technique is a local bias sampling operation (not shown) which performs a sampling operation on the bias current using one sampling switch and one sampling capacitor at each column of the pixel biasing unit 30. A second technique is a global bias sampling which performs a sampling operation on the bias current using one sampling switch 201 and one sampling capacitor 202 at the whole column as shown in FIG. 2. A third technique is a global bias sampling, which performs a sampling operation on the reference current using one sampling switch 301 and one sampling capacitor 302 at the whole column as shown in FIG. 3.

Figure 4:
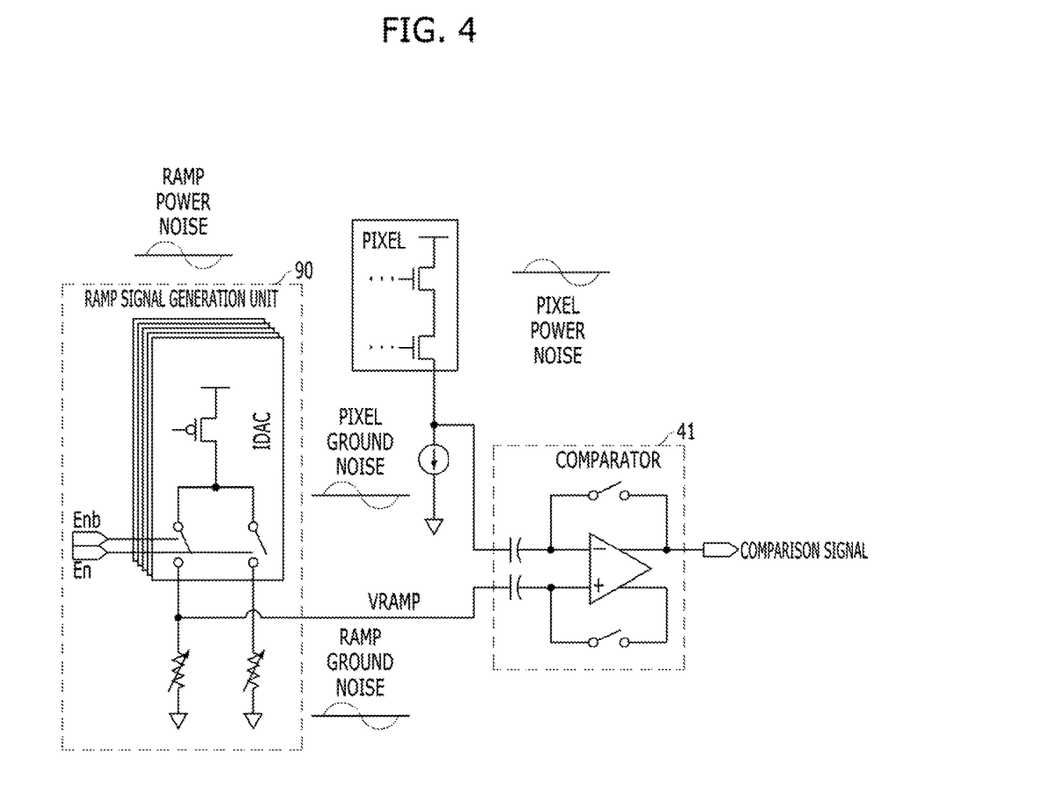
FIG. 4 is a diagram for describing a noise of two input terminals of a comparator.

Referring now to FIG. 4 a noise from the input terminals of the comparator 41 will be described.

Referring to FIG. 4, since a terminal of the comparator 41 is coupled to a pixel PIXEL through the pixel biasing unit 30, a pixel power noise and a pixel ground noise generated from the pixel are applied to the first input terminal of the comparator 41 and since the ramp signal generation unit 90 is coupled to the second input terminal of the comparator 41, the ramp power noise and the ground noise generated from the ramp signal generation unit 90 are applied to the second terminal of the comparator 41.

The pixel ground noise and the ramp power noise among various noises may be canceled using a sampling technique. The power noise may be canceled by adding a replica noise of the power noise to an output terminal of the ramp signal generation unit 90 and performing a CDS operation of the comparator 41.

However, in case of using the sampling technique as described above, it may be difficult to reduce or cancel a noise characteristic of the ramp ground noise which is provided to the pixel biasing unit 30.

For the ramp ground noise, a technique may be used according to which the ground supply voltage of the ramp signal generation unit 90 is maintained to be the same as the ground supply voltage of the pixel biasing unit 30. However, because of the difference of a ground noise transfer ratio between a transfer path of the ramp ground noise and a transfer path of the pixel ground noise, it may still be difficult to completely cancel the ramp ground noise, and a signal distortion may be caused by the ramp ground noise.

Thus, embodiments of the present invention include generating and adding a ramp ground noise to a bias current, applying an added bias current to a pixel biasing unit, and cancelling through a CDS operation of a comparison unit a ramp ground noise of a ramp signal generation unit. Various embodiments of the present invention will be described in more detail as below with reference to FIGS. 5 to 8.

Figure 5:
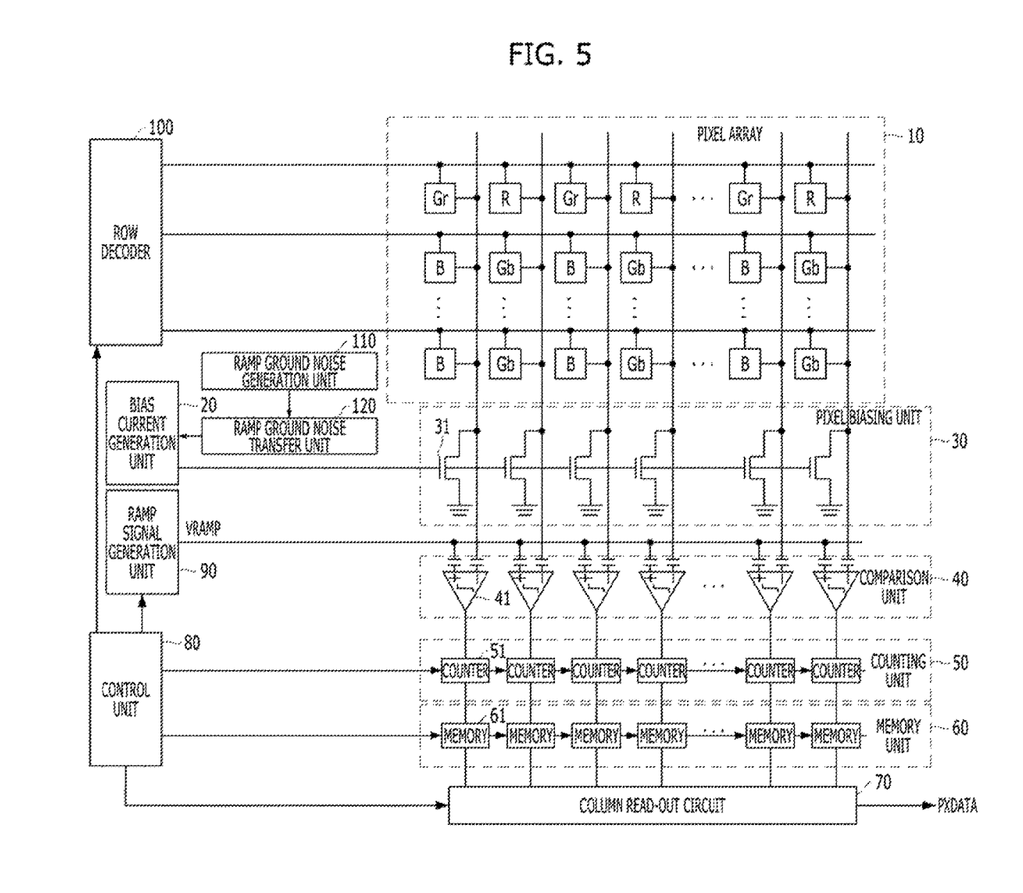
FIG. 5 is a block diagram illustrating a CMOS image sensor including a pixel biasing device not using bias sampling, in accordance with an embodiment of the present invention.
Figure 6:
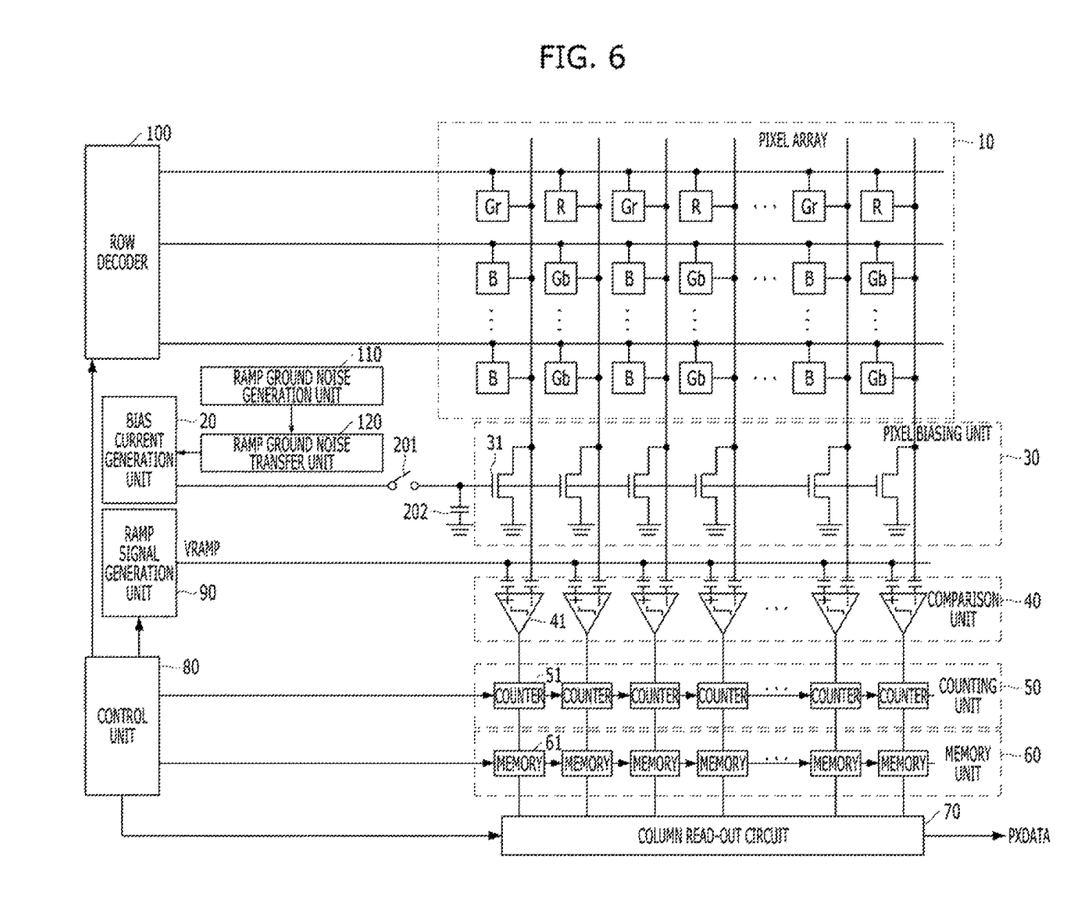
FIG. 6 is a block diagram illustrating a CMOS image sensor including a pixel biasing device using bias sampling, in accordance with another embodiment of the present invention.
Figure 7:
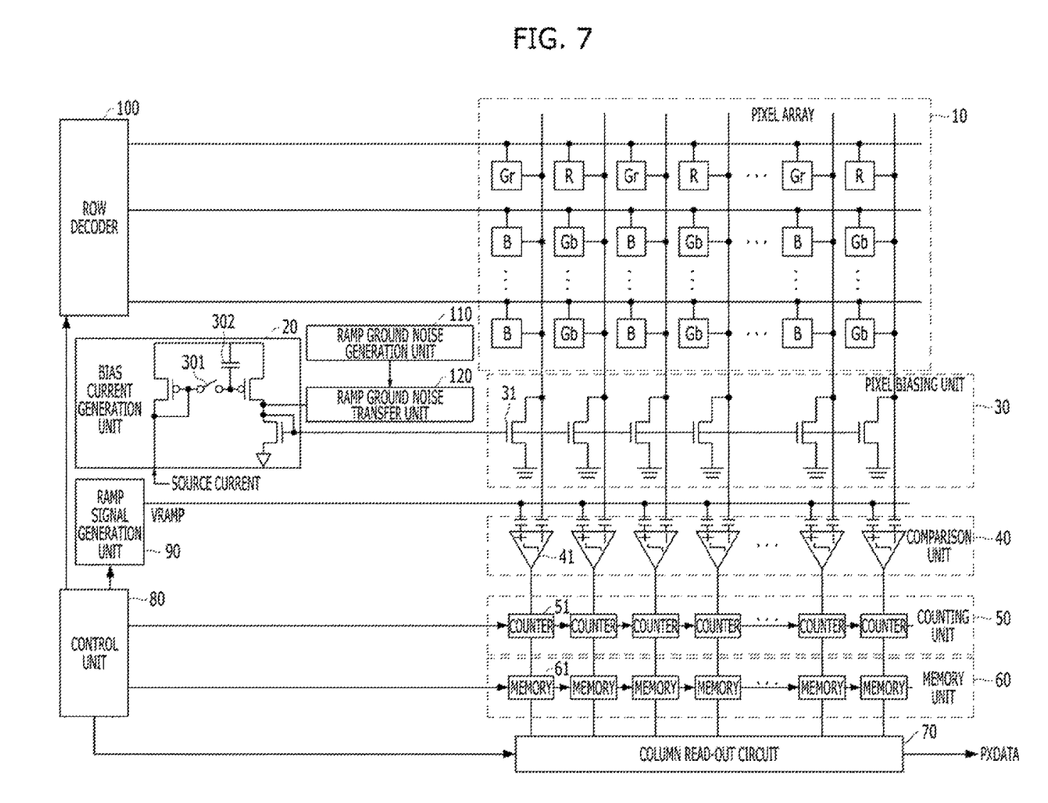
FIG. 7 is a block diagram illustrating a CMOS image sensor including a pixel biasing device using bias sampling, in accordance with still another embodiment of the present invention.
Figure 8:
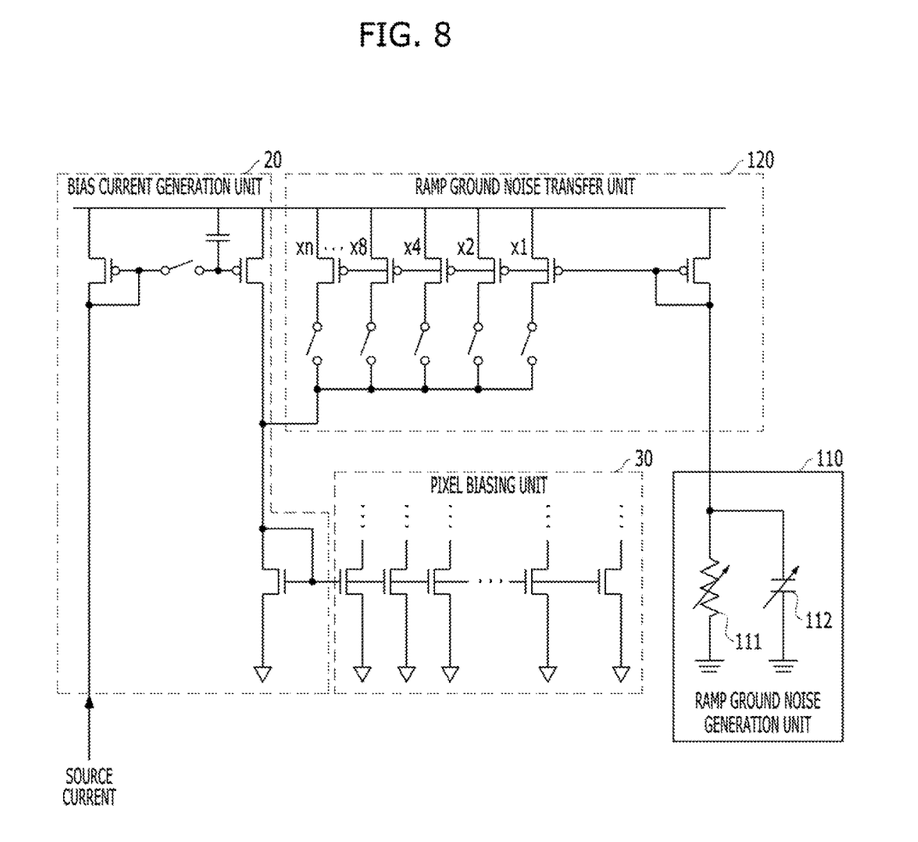
FIG. 8 is circuit diagram illustrating examples of a ramp ground noise generation unit and a ramp ground noise transfer unit shown in FIG. 7.

FIG. 5 is a block diagram illustrating a CMOS image sensor including a pixel biasing device which is not using a bias sampling, in accordance with an embodiment of the present invention. FIG. 6 is a block diagram illustrating a CMOS image sensor including a pixel biasing device using a bias sampling, in accordance with an embodiment of the present invention. FIG. 7 is a block diagram illustrating a CMOS image sensor including a pixel biasing device using a bias sampling, in accordance with still an embodiment of the present invention. FIG. 8 is detailed diagram of a ramp ground noise generation unit 110 and a ramp ground noise transfer unit 120 shown in FIG. 7.

As shown in FIGS. 5 to 7, the pixel biasing device includes the ramp ground noise generation unit 110, the ramp noise ground noise transfer unit 120, the bias current generation unit 20 and the pixel biasing unit 30.

In operation, the ramp ground noise generation unit 110 generates a ramp ground noise. The ramp ground noise transfer unit 120 transfers the ramp ground noise generated from the ramp ground noise generation unit 110. The bias current generation unit 20 generates a bias current according to a reference current and adds the bias current to the ramp ground noise outputted from the ramp ground noise transfer unit 120. The pixel biasing unit 30 performs a biasing operation on the pixel signal outputted from the pixel array 10 the bias current in which the ramp ground noise is reflected (or added).

As shown in FIGS. 5 to 7, a CMOS image sensor including the pixel biasing device, in accordance with an embodiment of the present invention, may include a pixel array 10, a row decoder 100, a ramp ground noise generation unit 110, a ramp noise ground noise transfer unit 120, a bias current generation unit 20, a pixel biasing unit 30, a ramp signal generation unit 90, a comparison unit 40, a counting unit 50, a memory unit 60, a control unit 80 and a column read-out circuit 70.

In operation, the pixel array 10 outputs a pixel signal corresponding to incident light. The row decoder 100 selects and controls pixels of the pixel array 10 at each row line under the control of the control unit 80. The ramp ground noise generation unit 110 generates a ramp ground noise. The ramp ground noise transfer unit 120 transfers the ramp ground noise which is generated from the ramp ground noise generation unit 110 to the bias current generation unit 20.

The bias current generation unit 20 generates a bias current according to an inputted reference current and adds the bias current to the ramp ground noise received from the ramp ground noise transfer unit 120. The pixel biasing unit 30 performs a biasing operation on the pixel signal outputted from the pixel array 10 according to the bias current in which the ramp ground noise is added. The ramp signal generation unit 90 generates a ramp signal under the control of the control unit 80. The comparison unit 40 compares a value of each pixel signal outputted from the pixel biasing unit 30 with a value of a ramp signal applied from the ramp signal generation unit 90. The counting unit 50 counts a clock signal outputted from the control unit 80 according to each output signal of the comparison unit 40. The memory unit 60 stores the counting information of the counting unit 50 under the control of the control unit 80. The control unit 80 controls operations of the row decoder 100, the ramp signal generation unit 90, the counting unit 50, the memory unit 60 and the column read-out circuit 70. The column read-out circuit 70 sequentially outputs the counting information stored in the memory 60 as the pixel data PXDATA under the control of the control unit 80.

The CDS operation and the analog-to-digital conversion operation are the same as the CDS operation and the analog-to-digital conversion operation described with reference to FIGS. 1 to 3, hence, these operations will now be omitted to avoid unnecessary duplication.

Next, referring to FIG. 8, the ramp ground noise generation unit 110, the ramp ground noise transfer unit 120, the bias current generation unit 20 and the pixel biasing unit 30 will be described in detail.

The ramp ground noise generation unit 110 generates a ramp ground noise (i.e., a current including the ramp ground noise). The ramp ground noise generation unit 110 may generate the ramp ground noise by any suitable method. For example, the ramp ground noise generation unit 110 may generate the ramp ground noise by sensing the ramp ground noise of the ramp signal generation unit 90, or by modeling the ramp ground noise of the ramp signal generation unit 90, or by using a ground power voltage of the pixel biasing unit 30 which is the same as a ground power voltage of the ramp signal generation unit 90 and using the pixel ground noise. For example, as shown in FIG. 8, the ramp ground noise generation unit 110 may generate the ramp ground noise using a variable resistance 111 and a variable capacitor 112.

The ramp ground noise transfer unit 120 adjusts and transfers the ramp ground noise (i.e., the current including the ramp ground noise), which is generated from the ramp ground noise generation unit 110, to the bias current generation unit 20. For example, as shown in FIG. 8, the ramp ground noise transfer unit 120 may be implemented using a current digital-to-analog conversion device, which is used in the ramp signal generation unit 90, and adjusts the ramp ground noise (i.e., the current including the ramp ground noise) through the current digital-to-analog conversion device. For reference, X1, X2, X4, X8, and Xn denotes the numbers of multiplication of a mirrored current.

The bias current generation unit 20 receives a source current (i.e., a reference current) from an external current supply unit (not shown) and generates a bias current by properly amplifying or reducing a current amount. The bias current generation unit 20 adds the ramp ground noise (i.e., the current including the ramp ground noise), which is outputted from the ramp ground noise transfer unit 120, to the bias current, and then provides the bias current, in which the ramp ground noise is reflected, to each bias transistor 31 of the pixel biasing unit 30.

The pixel biasing unit 30 transfers the pixel signal outputted from the pixel array 10 to the comparison unit 40 according to the bias current outputted from the bias current generation unit 20.

The detailed configuration of the ramp ground noise generation unit 110 and the ramp ground noise transfer unit 120 and a coupling configuration of the bias current generation unit 20 shown in FIG. 8 may be applied to the pixel biasing device and the CMOS image sensor shown in FIGS. 5 and 6.

Meanwhile, in case of the pixel biasing device and the CMOS image sensor shown in FIG. 6, since the ramp ground noise is added to a pre-terminal of a sampling switch 201 and a sampling capacitor 202, only the ramp ground noise having a lower frequency than a sampling frequency of a sampling unit including the sampling switch 201 and the sampling capacitor 202 is added to the pixel biasing unit 30. The sampling unit performs a sampling operation on the bias current outputted from the bias current generation unit 20.

In case of the pixel biasing device and the CMOS image sensor shown in FIG. 7, since the ramp ground noise is added to a post-terminal of a sampling switch 301 and a sampling capacitor 302, the ramp ground noise is added to the pixel biasing unit 30 irrespective of a sampling unit including the sampling switch 301 and the sampling capacitor 302. The sampling unit is included in the bias current generation unit 20 and performs a sampling operation on the reference current.

As described above, by adding the ramp ground noise having a different characteristic to the pre-terminal or the post-terminal of the sampling unit, only the ramp ground noise having a specific frequency band may be applied to the pixel biasing unit 30.

Although various embodiments of the present invention have been described for illustrative purposes, it will be apparent to those skilled in the art that various changes and modifications may be made without departing from the spirit and scope of the invention as defined in the following claims.

What is claimed is:

1. A pixel biasing device, comprising:
a ramp ground noise circuit, a bias current generation circuit, and a pixel biasing circuit;
the ramp ground noise circuit configured to generate a ramp ground noise and transfer the ramp ground noise to the bias current generation circuit;
the bias current generation circuit configured to generate a bias current by combining an inputted reference current with the ramp ground noise, which is transferred from the ramp ground noise circuit; and
the pixel biasing circuit configured to perform a biasing operation on an inputted pixel signal based on the bias current.

2. The pixel biasing device of claim 1, wherein the ramp ground noise circuit includes a ramp ground noise generation circuit and a ramp ground noise transfer circuit.

3. The pixel biasing device of claim 2, wherein the ramp ground noise generation circuit generates a current including flail the ramp ground noise.

4. The pixel biasing device of claim 3, wherein the ramp ground noise transfer circuit transfers the current including the ramp ground noise to the bias current generation circuit.

5. The pixel biasing device of claim 4, wherein the ramp ground noise transfer circuit uses a current digital-to-analog converter used for generating a ramp signal.

6. The pixel biasing device of claim 2, wherein the bias current generation circuit receives the reference current, amplifies or reduces a current amount of the reference current, generates the bias current, adds the transferred ramp ground noise to the bias current, and provides the bias current, in which the ramp ground noise is added, to the pixel biasing circuit.

7. The pixel biasing device of claim 2, further comprising:
a sampling circuit configured to perform a sampling operation on the bias current, which is inputted from the bias current generation circuit.

8. The pixel biasing device of claim 2, further comprising:
a sampling circuit configured to perform a sampling operation on the reference current.

9. An image sensor, comprising:
a pixel array suitable for outputting a pixel signal corresponding to incident light;
a row decoder suitable for selecting a pixel of the pixel array at each row line;
a ramp ground noise circuit configured to generate a ramp ground noise and transfer the ramp ground noise;
a bias current generation circuit configured to generate a bias current based on a reference current and add the ramp ground noise, which is transferred from the ramp ground noise circuit, into the bias current;
a pixel biasing circuit configured to perform a biasing operation on the pixel signal based on the bias current;
a ramp signal generation circuit configured to generate a ramp signal;
a comparison circuit suitable for comparing configured to compare the ramp signal with the pixel signal, which is outputted from the pixel biasing circuit;
a counting circuit configured to count a clock signal based on an output signal of the comparison circuit;
a memory configured to store counting information outputted from the counting circuit; and
a column read-out circuit configured to output the counting information stored in the memory circuit as pixel data.

10. The image sensor of claim 9, wherein the ramp ground noise circuit includes a ramp ground noise generation circuit for generating a current including flail the ramp ground noise.

11. The image sensor of claim 10, wherein the ramp ground noise circuit includes a ramp ground noise transfer circuit for transferring the current including the ramp ground noise to the bias current generation circuit.

12. The image sensor of claim 11, wherein the ramp ground noise transfer circuit uses a current digital-to-analog converter used in the ramp signal generation circuit.

13. The image sensor of claim 9, wherein the bias current generation circuit receives the reference current, amplifies or reduces a current amount of the reference current, generates the bias current, adds the transferred ramp ground noise to the bias current, and provides the bias current in which the ramp ground noise is added, to the pixel biasing circuit.

14. The image sensor of claim 9, further comprising:
a sampling circuit configured to perform a sampling operation on the bias current, which is outputted from the bias current generation circuit.

15. The image sensor of claim 9, further comprising:
a sampling circuit configured to perform a sampling operation on the reference current.

16. A pixel biasing method, comprising:
generating a ramp ground noise;
transferring the ramp ground noise;
generating a bias current based on a reference current;
adding the ramp ground noise into the bias current; and
performing a biasing operation on a pixel signal based on the bias current in which the ramp ground noise is added.

* * * * *